US011618326B2

(12) United States Patent
Koo

(10) Patent No.: US 11,618,326 B2
(45) Date of Patent: Apr. 4, 2023

(54) SYSTEMS, METHODS AND DEVICES FOR INDUCTION-BASED POWER HARVESTING IN BATTERY-POWERED VEHICLES

(71) Applicant: FERRARISPOWER CO., LTD, Seongnam-Si (KR)

(72) Inventor: Ja-Il Koo, Bellevue, WA (US)

(73) Assignee: FERRARISPOWER CO., LTD., Seongnam-Si (KR)

( * ) Notice: Subject to any disclaimer, the term of this patent is extended or adjusted under 35 U.S.C. 154(b) by 0 days.

(21) Appl. No.: 17/688,587

(22) Filed: Mar. 7, 2022

(65) Prior Publication Data
US 2022/0332193 A1 Oct. 20, 2022

Related U.S. Application Data

(63) Continuation of application No. 16/220,692, filed on Dec. 14, 2018, now Pat. No. 11,267,343, which is a (Continued)

(51) Int. Cl.
*B60L 5/00* (2006.01)
*G05D 1/00* (2006.01)
(Continued)

(52) U.S. Cl.
CPC ............ *B60L 5/005* (2013.01); *B60L 53/126* (2019.02); *G05D 1/00* (2013.01); *G05D 1/0094* (2013.01);
(Continued)

(58) Field of Classification Search
CPC .... B60L 5/005; B60L 53/126; B60L 2200/10; B60L 53/32; H02G 7/00; G05D 1/00;
(Continued)

(56) References Cited

U.S. PATENT DOCUMENTS 4,904,996 A * 2/1990 Fernandes ............ G01R 15/142
340/870.07
7,318,564 B1 * 1/2008 Marshall ................. B60L 53/11
244/12.3
(Continued)

FOREIGN PATENT DOCUMENTS

CN 103872795 A 6/2014
DE 102013004881 A1 9/2014
(Continued)

OTHER PUBLICATIONS

Anonymous: "MIT teaches a drone to perch on power lines so it can recharge during flight—by Geek.com," Jun. 23, 2014, XP055523524, Retrieved from Internet: URL: https://www.geek.com/chips/mit-teaches-a-drone-to-perch-on-power-lines-so-it-can-recharge-during-flight-1597462/ [retrieved on Nov. 13, 2018].
(Continued)

*Primary Examiner* — Valentina Xavier
(74) *Attorney, Agent, or Firm* — Jenkins, Wilson, Taylor & Hunt, P.A.

(57) ABSTRACT

The present disclosure relates to an electrically powered aircraft comprising: a propulsion system; a navigation control system operatively coupled to said propulsion system to navigate the aircraft to a desired location; a rechargeable electrical power storage to power the aircraft during operation; and a power line charging unit comprising a current transformer operatively coupled to said rechargeable electrical power storage and remotely operable to engage a power line in flight to recharge said rechargeable electrical power storage and remotely disengage said power line once recharged.

19 Claims, 7 Drawing Sheets

Related U.S. Application Data continuation of application No. PCT/US2017/037668, filed on Jun. 15, 2017.

(60) Provisional application No. 62/350,329, filed on Jun. 15, 2016.

(51) Int. Cl.
  *H02G 7/00* (2006.01)
  *B60L 53/126* (2019.01)
  *H02J 50/12* (2016.01)

(52) U.S. Cl.
  CPC ............... *H02G 7/00* (2013.01); *H02J 50/12* (2016.02); *B60L 2200/10* (2013.01); *Y02T 10/70* (2013.01); *Y02T 10/7072* (2013.01); *Y02T 90/12* (2013.01); *Y02T 90/14* (2013.01)

(58) Field of Classification Search
  CPC ........ G05D 1/0094; H02J 50/12; H02J 5/005; H02J 7/025; Y02T 10/70; Y02T 90/12; Y02T 90/14; Y02T 10/7072; B64C 2201/066; B64C 2201/108; B64C 2201/042
  See application file for complete search history.

(56) References Cited

U.S. PATENT DOCUMENTS

| | | | |
|---|---|---|---|
| 7,714,536 B1* | 5/2010 | Silberg | .................... B60L 50/90 320/108 |
| 8,167,234 B1 | 5/2012 | Moore | |
| 11,267,343 B2 | 3/2022 | Koo | |
| 2004/0083940 A1 | 5/2004 | Shelton et al. | |
| 2009/0256361 A1 | 10/2009 | Theuss et al. | |
| 2010/0100342 A1 | 4/2010 | Kressner et al. | |
| 2010/0280675 A1 | 11/2010 | Tate, Jr. et al. | |
| 2012/0056040 A1 | 3/2012 | Brotherton-Ratcliffe et al. | |
| 2012/0290164 A1 | 11/2012 | Hanson et al. | |
| 2015/0041598 A1 | 2/2015 | Nugent et al. | |
| 2016/0137311 A1* | 5/2016 | Peverill | .................... B64C 25/68 701/16 |
| 2019/0135113 A1 | 5/2019 | Koo | |
| 2020/0391600 A1* | 12/2020 | Beranger | .................. B60L 5/42 |

FOREIGN PATENT DOCUMENTS

| | | |
|---|---|---|
| DE | 102015206844 A1 | 11/2015 |
| KR | 101317220 B1 | 10/2013 |
| KR | 101564254 B1 | 10/2015 |
| WO | WO 2017/218768 A1 | 12/2017 |

OTHER PUBLICATIONS

European Examination Report corresponding to EP Patent Application EP17814088.5 dated Mar. 25, 2021.
Extended European Search Report corresponding to EP Patent Application No. EP17814088.5 dated Dec. 20, 2019.
International Search Report corresponding to International Application No. PCT/US2017/037668 dated Oct. 12, 2017.
IPRP and Written Opinion corresponding to International Application No. PCT/US2017/037668 dated Dec. 18, 2018.
Notice of Allowance corresponding to U.S. Appl. No. 16/220,692 dated Feb. 19, 2021.
Notice of Allowance corresponding to U.S. Appl. No. 16/220,692 dated Nov. 4, 2021.
Notice of Allowability corresponding to U.S. Appl. No. 16/220,692 dated Nov. 23, 2021.
Office Action corresponding to U.S. Appl. No. 16/220,692 dated Jun. 10, 2021.
Office Action corresponding to Chinese Patent Application Serial No. 201780037731.5 dated Sep. 30, 2021.

* cited by examiner

SYSTEMS, METHODS AND DEVICES FOR INDUCTION-BASED POWER HARVESTING IN BATTERY-POWERED VEHICLES

RELATED APPLICATIONS

The presently disclosed subject matter is a Continuation Application of U.S. patent application Ser. No. 16/220,692, filed Dec. 14, 2018, which claims the benefit of International Patent Application No. PCT/US2017/037668 filed Jun. 15, 2017, which claims priority to U.S. Provisional Patent Application Ser. No. 62/350,329, filed Jun. 15, 2016; the disclosures of which are incorporated herein by reference in their entirety.

TECHNICAL FIELD

The present disclosure relates to electrically-powered vehicles and related systems, methods and devices for induction-based power harvesting that are suitable for electrically-powered vehicles.

BACKGROUND

In one embodiment, the subject matter disclosed herein relates to a power line charging mode unmanned flying apparatus and related charging method, in particular, and further to battery-powered vehicles and charging methods that do not require a return to the power supply during travel by recharging through a power line during a travel route.

Generally, flying apparatuses, including unmanned drones, use electricity, and many use a propulsion means powered by a battery; such apparatuses have been used for various purposes, such as military, weather stations, recreational, industrial, environmental monitoring, disaster relief and it is possible to fly from a wide variety of patterns by using artificial intelligence (AI) mounted inside or by the operation of the user.

In general, the unmanned flying devices are limited by their available stored electrical power, and are therefore stopped and returned to the ground to replace or re-charge the battery for operation if the battery power is depleted.

However, in this case, time-of-flight time and radius is thus significantly reduced and restrictions on the use of such flying devices are unavoidable.

Controlling the operation of a plurality of radio stations and the radio station, including drones and charging pad with a wireless rechargeable battery, are disclosed in Korea Patent Registration No. 10-1564254 call.

However, in that and other such systems, time-of-flight of the drone is still limited where the local radio station is not provided, and there is also a problem that the cost for installing additional wireless stations occurs. Moreover, even if such wireless stations could be installed, providing such stations on or near a desired route would restrict the available routes for such vehicles.

In some power line harvesting applications, which use induction-based electrical power generation from the electromagnetic (EM) field associated with a power line, there may be an associated magnetic force generated by the EM field that may inhibit the use of an openable coil or other induction-based electrical power generation devices. When the device is in the presence of such a magnetic force, it may be difficult for the openable device to move from a closed position to an open position, or from an open position to a closed position in a controlled manner.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary and a basic understanding of some aspects of the disclosed subject matter. This summary is not an exhaustive overview of the embodiments or aspects of the disclosed subject matter. It is not intended to restrict key or critical elements of the disclosed subject matter or to delineate the scope of the disclosed subject matter beyond that which is explicitly or implicitly described by the following description and claims.

A need exists for systems, methods and devices for induction-based power harvesting in battery-powered vehicles that overcome some of the drawbacks of known techniques, or at least, provides a useful alternative thereto. Some aspects of this disclosure provide examples of such systems, methods and devices that relate to a battery-powered vehicle with a control aspect for utilizing existing power line infrastructure for ensuring there is sufficient battery-power in its power storage components.

In accordance with one aspect, there is provided an electrically powered aircraft comprising: a propulsion system; a navigation control system operatively coupled to said propulsion system to navigate the aircraft to a desired location; a rechargeable electrical power storage to power the aircraft during operation; and a power line charging unit comprising a current transformer operatively coupled to said rechargeable electrical power storage and operable, remotely or through operation of the navigation control system, to engage a power line in flight to recharge said rechargeable electrical power storage and remotely disengage said power line once recharged.

In accordance with another aspect, there is provided a vehicle, said vehicle being powered by electrical power, the vehicle comprising: a propulsion system, said propulsion system for controllably causing the vehicle to move to one or more desired locations, said propulsion system being electrically powered; a rechargeable electrical storage for storing electrical power and providing at least some of said electrical power for the vehicle; a navigation system to provide movement instructions for said vehicle indicative of said desired locations relative to a current location; and a power line charging unit, the power line charging unit comprising a removably attachable deflector for generating through induction electrical power from a power line electromagnetic field, wherein the deflector comprises a coil and a magnetic core and said deflector generates an electrical current through induction.

In accordance with another aspect, there is provided a vehicle-based routing method for a vehicle, said vehicle comprising an electrically powered propulsion system for controllably causing the vehicle to move to a desired location, a rechargeable electrical storage for storing electrical power and providing electrical power for the vehicle, and a power line charging unit, the power line charging unit comprising a removably attachable deflector for generating through induction electrical power from a power line electromagnetic field, wherein the deflector comprises a coil and a magnetic core, said method comprising the steps: determining, based on the distance between the vehicle and the desired location and a weight of the vehicle plus a vehicle payload, a required amount of electrical power for moving the vehicle to the desired location; if said required amount is less than an amount stored in the storage component, accessing a power line database for providing one or more power line locations; and generating a route from a current location of the vehicle to the desired location, wherein the route includes, if said required amount is less than an amount stored in the storage component, at least one power line location and wherein the required amount between any two consecutive locations on said route would be less than a maximum capacity of said storage component.

In accordance with another aspect, there is provided a power-line induction-based power harvesting device for releasably engaging with power lines, comprising an openable deflector component having an axial opening along the length of said deflector, said deflector component comprising a coil and a magnetic core that enclose power lines within said opening when engaged with a power line, said harvesting device configured to collect electrical power generated through induction within said coil; wherein said harvesting device is configured to generate an opposing magnetic force that is opposite in direction to an enclosed power line magnetic force generated by an electromagnetic field generated by the enclosed power line which inhibits opening of the deflector.

In accordance with another aspect, there is provided a method of releasably engaging a power line with an induction-based power harvesting device, said power harvesting device for releasably engaging with power lines, comprising an openable deflector component having an axial opening along the length of said deflector, said deflector component comprising a coil and a magnetic core that enclose power lines within said opening when engaged with a power line, said harvesting device configured to collect electrical power generated through induction within said coil, the method comprising: positioning said power harvesting device, having the deflector in an open position, so that said deflector is substantially enclosing said power line; closing said deflector for induction-based power generation by said deflector from a power line electromagnetic field; and opening said deflector after said deflector has generated at least some induction-based power; wherein a magnetic force, opposite in direction to a power line magnetic force resulting from said power line electromagnetic field, is generated during at least one of the opening and closing of said deflector.

In accordance with another aspect, there is provided a system for charging a battery-powered unmanned vehicle, the system comprising: an openable induction-based power harvesting device, said power harvesting device for releasably engaging with power lines, comprising an openable deflector component having an axial opening along the length of said deflector, said deflector component comprising a coil and a magnetic core that enclose power lines within said opening when engaged with a power line for generating electrical power through induction; an electrical-power storage component connected to said power harvesting device; and a propulsion system for positioning said vehicle for engagement with a given power line.

In one embodiment of the present disclosure, unmanned flying devices are to be provided a power line charging system and charging method for making unmanned flying devices that are not constrained by time of flight caused by receipt of power from a charging cable, a current flow, such as power lines, during flight.

Without having to install additional devices and/or locations for charging on the flight path of the unmanned flying devices, power line charging scheme seeks to provide charging methods by using existing power line infrastructure.

The power line charging mode in the unmanned flying apparatus uses the charging part which, when engaged with power lines, generates electricity using electromagnetic induction for charging; a charging control part which measures the electrical power for unmanned flight periodically to determine if the residual amount of the battery power unit is less than a first value (where the first value may be predetermined and/or calculated, and is associated with an amount of power remaining in power storage and/or an amount of power required to reach a given destination). If the residual amount is less than the first value, the charging control part transmits a charge request signal; if the residual amount of the battery power is more than a second value (which may be greater than or equal to the first value), the charging control part transmits a signal to stop charging. A navigation part retrieves or determines a location of a power line, and assists coupling of the power line and the charging part; in such embodiments, the navigation part includes a maneuvering part for positioning said apparatus at a power line for coupling.

In some embodiments, there is provided a power line coupling member for coupling the charging part to a power line. The power line coupling member comprises a deflector (which may refer to a charging transformer or a current transformer) that further comprises a magnetic core and a coil to generate an electric power using electromagnetic induction. Embodiments hereof may further include a measurement module comprising at least one of a distance sensor, or other type of sensor, and a camera to measure the distance to the power line from the charging part and to assist in maneuvering said apparatus into correct position for coupling with the power line.

In some embodiments, the measurement modules are arranged in the vertical central axis of the through hole formed in the power line coupling member and it is able to obtain a distance value, as well as a relative position value, with respect to the power line.

In some embodiments, there is provided a power line coupling auxiliary search module to search the position of a power line for charging that is at least within a distance that is less than the maximum distance that can be travelled with the residual power remaining in power storage, or when the charging request signal is otherwise triggered. Embodiments may further comprise a coupling control module to control the coupling of the power line and the coupling member.

In some embodiments, when a charging request signal is initiated, a combination control module opens the charging part, so that the through hole of the charging part may enclose a power line, if the measurement value set based on the measurement module is equal to or less than a first distance measurement value (indicating that the charging part is adjacent to the power line) and closes said charging part when it reaches the second distance value (indicating that the charging part is in a position having a power line within the through hole).

In some embodiments, the combination control module, when obtaining the charge stop signal, opens the through hole and, when the measured value of the measuring module is at least equal to the first distance value, it will close the through-hole.

In some embodiments, the combination control module further comprises a magnetic removal device, the removal device is used to control the magnetic coupling with the power line by carrying out the removal, or removal or reduction of the magnetic field of the magnetic core. Such removal or reduction permits the charging part to open or close with reduced force irrespective of a magnetic force from a power line electromagnetic field opposing such opening or closing motion.

According to an aspect of the instant disclosure, a method of charging an unmanned flying apparatus by a power line is provided. In embodiments, a method of charging from a power line for the unmanned flying apparatus comprises: a) identifying the remaining battery power of the unmanned flying apparatus; b) determining the location of the filling position of the power line (i.e. the location of an available and within-range power line) when the battery power level is less than a predetermined, calculated or received first set value; c) performing, by the charging part, a charging of the battery from the power line when the apparatus has engaged the power line; and d) when the battery power level is more than a predetermined, calculated or received second set value, determining a charging completion of the battery. In some embodiments, the method may further comprise a step of repeating steps a) through d), if the battery power level is less than the first set value. In some embodiments, the method may further comprise, at step b), a determination of the nearest power line and the relative position of the unmanned flying apparatus to the filling position. In some embodiments, step c) may further comprise the use of the induced power generated from the magnetic field generated from the power line to charge the battery. In some embodiments, step d) may further comprise, wherein when the power left in the battery is less than the second set value, repeating step c).

In some embodiments, there is disclosed an electrically powered mobile communications interface comprising a propulsion system, a data communications connection component for network connection, wirelessly accessing one or more communications networks and providing wireless access thereto for one or more end-user communications devices that are within a communications range with said network connection, a rechargeable electrical power storage to provide electrical power to the mobile communications interface, and, in some embodiments, the propulsion system and/or the data communications connection component, and a power line charging unit comprising a current transformer operatively coupled to said rechargeable electrical power storage and operable to engage a power line in flight to recharge said rechargeable electrical power storage and remotely disengage said power line prior to further movement of said mobile communications interface.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

DETAILED DESCRIPTION

Figure 1:
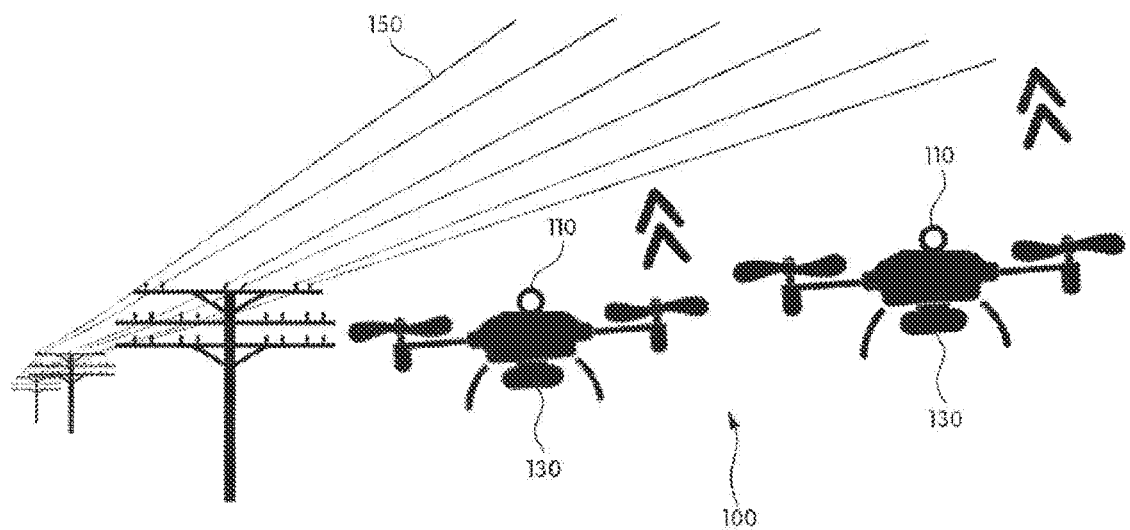
FIG. 1 is a view showing a power-line charging mode unmanned flying apparatus according to one embodiment of instant disclosure.

The systems and methods described herein provide, in accordance with different embodiments, different examples in which systems, methods and devices for induction-based power harvesting in battery-powered vehicles are described in additional detail. The following examples are illustrative in nature and are not intended to be exhaustive examples of the claimed subject matter.

In some embodiments, there are provided methods, systems, and devices for associating battery-powered, and often unmanned and/or flying, vehicles with a power charging system. Such power charging system permits such vehicles, which may include vehicles commonly referred to as "drones," to utilize existing power line infrastructure for recharging its batteries during or between periods of travel. As such, vehicles in accordance with the instantly described subject matter can greatly increase their possible range and/or payload (if or as may be required). Since existing power lines are commonly found along major routes and amongst more populated and/or industrialized areas, routes to a vast range of destinations can be made possible that include enough power line sites suitable for engagement between a current location of such vehicle and a final destination. In some embodiments, the vehicle will include sensors (including positional indicators) that will facilitate coupling to nearby power lines without external assistance.

In some embodiments, the vehicle will have access to power line location information (or will otherwise be able to identify or obtain such location information, for example by detecting EMF sources via an EMF detector) so as to re-charge without external intervention or assistance. In some embodiments, a vehicle can determine a route in advance such that the vehicle can reach a given destination wherein there is no portion of the route where any two power line charging sites are not greater than the maximum distance of travel for a vehicle (with or without payload, as the case may be) based on the capacity of the electricity storage of the vehicle.

In some embodiments, there is provided a magnetic field opposer that may use any, or a combination of, a switch and/or a magnet and/or an electrically conductive material to eliminate a magnetic field acting upon the charging component. This magnetic field opposer can be configured to eliminate (or significantly reduce the force of) an existing magnetic force, or it may generate a magnetic force having a direction of force that is opposite to any magnetic force that may result from a power line electromagnetic field. Such a magnetic field opposer may thereby facilitate an opening or closing of an induction-based charging device around or near said power line. In some embodiments, vehicles utilizing such a charging device must be able to attach and detach from a power line in the presence of an electromagnetic field, without external assistance or leverage (for example, in the case of flying drone utilizing a person-inaccessible, or nearly inaccessible, power line charging site). The magnetic field opposer can be configured to facilitate the opening and closing around a power line without the need for excessive mechanical force being applied to said device, which would otherwise be required in the presence of a strong electromagnetic field emitted by, for example, a high-voltage power line that in turn would cause a strong magnetic force within the charging device. In cases where there is a magnetic force generated by the magnetic field generator, such force should be substantially opposite in direction although it need not be of completely equal strength. The opposing magnetic force should at least have a magnitude, in the direction opposing the power line magnetic force, which would permit the charging device release mechanism to operate without undue resistance. Likewise, in cases where the magnetic force opposing the opening of a split core (or similar) charging device is eliminated through the use of a switch, grounding, or other type of signal interference or removal, the magnetic force need not be completely removed, but rather only removed to the point where the split core (or similar) charging device can be disengaged from the power line without requiring excessive and/or external force.

In some embodiments, a power line charging mode unmanned flying apparatus and a charging method in accordance therewith is provided according to an embodiment of the present disclosure. In embodiments, a battery supplied with power from the power line current flow results in a vehicle that is not limited to the time of flight and flight radius of the unmanned flying device as may be limited by the capacity of the battery. In addition, a power line charging mode unmanned flying apparatus and a charging method therefor is provided in accordance with an embodiment of the present disclosure, wherein a battery supplied with power from the power line current flow avoids the need of purpose-built charging stations. This and other exemplary embodiments will be described below so that in the art of the instantly disclosed subject matter, with reference to the accompanying drawings, embodiments of the instant disclosure can be carried out by one with ordinary skills in such art. The disclosed subject matter may be embodied in many different forms and should not be construed as limited to the embodiments set forth herein. In the figures, parts not related to the description are omitted in order to clearly describe the instantly disclosed subject matter, the same reference symbols are attached to the same or like elements throughout the specification.

In one embodiment, the power line charging mode unmanned flying apparatus according to an embodiment of the present disclosure can perform a continuous flight route (i.e. a route that does not include returning to a point of origin or purpose-specific charging/battery replacement location) by charging the battery using a current generated in the charging section in combination with any power line available that would permit the apparatus to reach its destination.

In another embodiment, there is provided an electrically powered vehicle, which is an aircraft in some cases, said vehicle comprising a propulsion system; a navigation control system operatively coupled to said propulsion system to navigate the vehicle to a desired location; a rechargeable electrical power storage to power the vehicle during operation; and a power line charging unit comprising a current transformer operatively coupled to said rechargeable electrical power storage and remotely operable to engage a power line in flight to recharge said rechargeable electrical power storage and remotely disengage said power line once recharged.

In the case of an aircraft, the propulsion system may comprise, for example, two or more propellers; one or more with propellers with an anti-torque component; one or more fixed wings with one or more propellers; or any other means of causing the vehicle to fly in a controlled manner. In the case of a land-based vehicle, it may include wheels, articulable legs, treads, or a combination thereof. In the case of water-based vehicle, it may comprise propellers, impellers, or fins. Other types of propulsion may be used without departing from the scope and spirit of the claimed subject matter of the instant disclosure. The propulsion system will be configured to cause the vehicle to controllably move from an initial position to a desired location (which may include intermediate and final destinations). In some embodiments, the propulsion system will also be configured to controllably position a vehicle in a relatively stationary position relative to a power line for charging, particularly when maneuvering a vehicle into the coupling or charging position with a power line. Once the vehicle is coupled to a power line, the propulsion system may or may not be required to maintain the vehicle's position.

In some embodiments, the navigation system may comprise specialized computing device, comprising at least a processor and RAM, that can interpret location and position information, and also control the propulsion (or send control signals or instructions thereto) of the vehicle to cause the vehicle to move from an initial location to a given destination. The given destination may be a final location or it could be any of a plurality of charging locations at power lines between the initial location and the final location; it may also comprise destinations relating to concurrent routes. The navigation system may comprise, or comprise access to, various location identifiers; this may include, but is not limited to, GPS or other similar systems (e.g. GLONASS and other proprietary systems, etc.), network-based (e.g. Wi-Fi) positioning systems, compasses, accelerometers, gyroscopes, altimeters, etc., as well as additional or complementary mapping information. The navigation system may also comprise positional sensory componentry, such as: a camera, a gyroscope, an accelerometer, a pressure sensor, a motion detector, a light sensor, a distance sensor, a combination of a light source and the light sensor, radar, and LIDAR. Other systems and componentry for location and position identification that may be known to persons skilled in the art may be used without departing from the scope and spirit of the instantly disclosed subject matter. The navigation system may also have stored therein, or have access to, location information relating to available power lines (e.g. a database of power line location and other information). In addition, the navigation system also has instructions stored thereon (or, alternatively, it may have access to a set of such instructions) for determining a route between any initial location and destination location that includes sufficient intermediate charging locations (i.e. available power lines) such that there is no travel distance between any two consecutive locations on such a route that requires more electrical power than the vehicle is capable of storing, taking into account the rate at which electrical power is consumed by such vehicle during travel, including for varying payloads (weight and size), different prevailing weather and atmospheric conditions, geography and physical impediments to travel (e.g. buildings, trees, etc.), or any other factor that may influence consumption rate of stored electrical power. The points on a route may include: (i) intermediate locations (e.g. for charging or those that may be associated with concurrent routes), (ii) an initial location (i.e. origin), and (iii) the final destination. In some cases, the navigation system may require that the distance in a given route between any two consecutive such destinations is less than the maximum travel distance of the vehicle based on the capacity of the electrical power storage and an estimated rate of consumption; in some cases, the maximum distance will be based on the amount of electrical power currently stored (as opposed to the capacity) at any given time, in particular, the distance between the initial location and the first subsequent location (whether an intermediate or final destination). In some cases, the navigation system may also require that the maximum distance between the penultimate stop and the final destination is such that the vehicle will have enough stored electrical power remaining in order to travel to the nearest charging location from the final destination. The navigation system may also be configured to generate routes that include specific intermediate destinations and/or includes or avoids specific regions or locations, while continuing to ensure that the vehicle does not include any route segment that would exceed its electrical power in storage (due to the distance and the estimated rate of power consumption). In some cases, a requirement will be imposed that no distance would cause the vehicle to drop below a buffer amount of electrical power to, for example, account for error or unforeseen circumstances creating a difference between the estimated and actual rates of power consumption. In embodiments, the navigation system and the propulsion system are coupled such that the navigation system provides route and positional information to the propulsion system, which, based on said information, causes the vehicle to move, and be positioned, in accordance therewith. The navigation may use artificial intelligence (AI) to determine route patterns, or use instructions from a user. An entire predetermined route may be generated before travelling or upon a change in circumstances that necessitates a change in a previously planned route. Alternatively, the vehicle may select additional intermediate destinations and/or other changes in a route in an ad hoc manner as it reaches each destination; for example, a vehicle may travel directly to a given destination and if there is insufficient residual power to reach a planned destination (intermediate or final), the navigation system may select the next available power line for charging that is closest to the destination and then repeat until it reaches the destination.

In embodiments, the electrical storage component may be any device or component that is capable of storing electrical power. In some embodiments, it may include one or more batteries, one or more capacitors, or a combination thereof. It may also include other devices for storing electricity that would be known to persons skilled in the art without departing from the scope and spirit of the instantly disclosed subject matter.

In embodiments, a power line charging unit, or charging part, comprises a current transformer comprising a magnetic core and a coil arranged around said magnetic core. In some embodiments, the current transformer is a split core transformer, thereby permitting the opening and closing of the current transformer. This permits the opening of the transformer for both coupling and decoupling around an available power line. The electromagnetic field generated by a power line when the charging unit is coupled thereto is used to generate an electric current within the current transformer through induction and said electric current is then used to store electrical power in associated power storage. The current transformer is sometimes referred to herein as a deflector.

In some embodiments, there is provided a charging device, which may be associated with electrically-powered vehicles, wherein said power line charging unit generates or is otherwise acted upon by an opposing magnetic force opposite in direction to a power line magnetic force generated by the power line electromagnetic field, particularly when reconfiguring said charging unit between an open position and a closed position. The generated magnetic force need generate only sufficient force opposing the magnetic force generated by the power line so that the mechanics of the charging device can overcome the resulting force when opening or closing the deflector.

In some embodiments there is provided a power-line induction-based power harvesting device for releasably engaging with power lines, and a method associated therewith. Devices of the instantly disclosed subject matter may comprise an openable charging unit having an axial opening along the length of said charging unit, said charging unit component comprising a coil and a magnetic core that enclose power lines within said opening when engaged with a power line, said harvesting device configured to collect electrical power generated through induction within said coil; wherein said harvesting device is configured to generate an opposing magnetic force that is opposite in direction to a power line magnetic force generated by an electromagnetic field generated by an enclosed power line which inhibits opening of the charging unit. In some embodiments, such a harvesting device may be secured to a vehicle that is electrically-powered, including unmanned and/or remotely controlled vehicles and drones.

In some embodiments, there is provided a method of releasably engaging a power line with a power harvesting device described herein, the power harvesting device generating electrical power through induction from a power line with which the device is engaged, the method comprising: positioning an openable power harvesting device adjacent to a power line; opening the openable power harvesting device; positioning the device so that, when closed, the openable power harvesting device will enclose the power line within the axial opening of the openable power harvesting device; closing the openable power harvesting device and initiating induction-based power generation by the openable power harvesting device from the power line electromagnetic field; and opening said openable power harvesting device after at least some induction-based power has been generated; wherein prior to opening and closing the openable power harvesting device, the method includes generating a magnetic force opposite in direction to the magnetic force resulting from said power line electromagnetic field.

In some embodiments, the current transformer comprises a split core transformer remotely actuated to engage and disengage said power line for an aircraft while in flight. In some such embodiments, the navigation control system is operable to automatically identify proximity to said power line and navigate the aircraft thereto to be recharged, and using such proximity information and/or other positional information, position the aircraft appropriately during engagement and disengagement. In some cases, such aircraft may further comprise a navigation control system which comprises a GPS receiver to automatically identify a current GPS location of the aircraft, and wherein said navigation control system is operable to access a GPS location of available power lines to automatically navigate the aircraft from said current GPS location using said GPS receiver. Using this information, the aircraft navigation system can determine a route from an initial position to a final destination without having to return to an origin or a specified destination for recharging or battery replacement; rather, it can plan a route that includes sufficient pre-existing power line locations from which it can recharge its batteries. In embodiments, the aircraft may further comprise a power storage level monitor, and wherein said navigation control system is invoked, upon triggering a charging mode, for example, to navigate said aircraft to said power line upon said level monitor identifying a storage power level below a designated threshold. In some cases, as such, provided that there is sufficient confidence of power line availability between an origin and a final destination (such as, for example, within a large and dense city or along a major transportation route that may exist between such locations), advanced and detailed route planning for each charging stop may not be necessary.

In some embodiments, there is provided a vehicle, powered by electrical power, comprising a propulsion system, said propulsion system for controllably causing the vehicle to move to a desired location, said propulsion system being electrically powered. The vehicle further comprises a rechargeable electrical storage for storing electrical power and providing at least some of said electrical power for the vehicle; in some cases, such storage comprises one or more batteries, one or more capacitors, or a combination thereof. The vehicle further comprises a navigation system to provide movement and position instructions for said vehicle, said instructions indicative of said desired locations (which may include a final destination as well as intermediate destinations, such as power line locations for recharging the rechargeable electrical storage) relative to a current location and, in some cases, of positional requirements for engaging with power lines for charging. The vehicle further comprises a power line charging unit, the power line charging unit comprising a removably attachable deflector for generating through induction electrical power from a power line electromagnetic field. The deflector, also referred to herein as a current transformer, comprises a coil and a magnetic core and said deflector generates an electrical current through induction. The electrical current is stored as electrical power in the storage.

Embodiments hereof may engage with any conductive material that will fit within the openable power line charging unit and carries electricity. Typically, embodiments will use available utility power transmission lines, but a power line, as used herein, may include any electrically conductive material. In embodiments, an acceptable power line may carry AC or DC electricity. Embodiments hereof may couple to any power line that is capable of carrying any current sufficient to generate an EMF field; including high voltage power lines as well as lines associated with much lower voltages (such as those found connected to, or within, a typical household).

In some embodiments, the vehicle is capable of determining an indication of remaining power available in storage so that, when available storage is less than a threshold amount, the vehicle can be navigated to any available power line for charging. Such available power line should preferably be within the current acceptable travel range, accounting for expected power consumption (which may take into consideration the weight of the vehicle plus payload, route-related factors that may affect power consumption—such as power line height and altitude, and other extraneous factors—such as weather and physical obstructions) and whether a candidate power line charging site is within range of the desired destination or another available power line charging site (or series of such power line charging sites such that no consecutive pair of charging sites exceed the range of the vehicle and for which the final destination is within range of the final charging site).

In some embodiments, the vehicle may include a navigation system that automatically determines the next location, which may include the final desired destination or an intermediate destination for charging; or in some embodiments, for beginning or ending other route travels. For example, it is possible that the vehicle may have overlapping routes that share some or all of a route or portion thereof, a desired or intermediate destination, or an origin or final destination; in other words, concurrent routes or partially concurrent routes can be taken. In such cases, the navigation system may include processing capabilities to determine optimal routes for carrying out two or more such routes, at least in part, concurrently. As a more specific example, the vehicle navigation system may include software that permits it to determine realizable power consumption and time savings by, during a first delivery of a first set of cargo, picking up a second or more sets of cargo for additional one or more deliveries (and possibly delivering some or all of same during or after said first delivery). The processing capability for determining such combined routes may also permit for some weighting or tolerance of priorities for some deliveries over others (e.g. a first delivery may be of such importance and/or urgency and/or delivery class, that any delay or additional consumption in subsequent deliveries caused by the first delivery may be tolerated or relatively less important). In some embodiments, the navigation system may automatically determine a route from a current location to a final desired location, including any intermediate charging sites that may be required to reach a desired (including final) destination. If there are multiple routes available, the navigation system may be configured to select a route that optimizes one or more route characteristics, such as time, total power consumed, inclusion or avoidance of a given area or location, ability to include more than one route at any given time, prioritization of different delivery classes (e.g. first class or higher priced deliveries may be prioritized), etc.

In some embodiments, a desired location may comprise a specific position of said vehicle relative to a power line charging site, as well as the location of that power line charging site. In other words, a given desired location may not only include a geographic location, but also a position that will be required in order for a vehicle to engage with a power line charging site. Such a position may depend on the orientation of the charging unit on a given vehicle. In some embodiments, irrespective of whether the desired location includes a position, the vehicle may be capable of positioning itself appropriately for engaging with a power line for charging; vehicles may include one or more location sensors for positioning itself relative to a power line immediately prior to, during, and after charging. In some cases, the location sensors may comprise geographical location sensors, such as GPS or other generic and/or proprietary global positioning systems. The geographical location sensors may, in combination with one another or in combination with pre-existing information, be used to determine a current position and/or a route to one or more destinations. In some embodiments, the one or more location sensors may comprise one or more of the following: a camera, a gyroscope, an accelerometer, a pressure sensor, a motion detector, a light sensor, a combination of a light source and the light sensor, radar, and LIDAR. Some of the foregoing may be both geographical location sensors, or they may be used as positional location sensors; positional location sensors may be any such sensors that, alone or in combination with other sensors or other information, provide an indication of the position of the vehicle relative to a fixed reference (e.g. a power line charging site). In some embodiments, the navigation system may be configured to provide instructions that move the vehicle into a charging position relative to a given power line, wherein the charging position is suitable for engagement by said charging component with said given power line.

In some embodiments, some aspects of the vehicle may be remotely controlled. For example, instructions regarding the origin, one or more destinations, regions or areas to avoid or to include, power line location information may be remotely supplied. In other cases, there may be even greater control over the vehicle's motion that is provided remotely (e.g. specific patterns or movements). In some embodiments, the vehicle is unmanned. For example, the vehicle may be a drone, with varying levels of remote control or remote information provision.

In some embodiments, there may be provided a navigation system, with related methods, wherein a charging mode is initiated when said remaining power is less than a threshold value. Said threshold value may be the vehicle's expected travel range based on an expected rate of power consumption. In other cases, the threshold value may be a predetermined value, which may be set by a user and/or based on a maximum travel distance associated with the capacity of power storage for the vehicle and/or the distance to the next destination. In such cases, the system may identify available power lines for charging and select from such available power lines a suitable next (or intermediate destination).

In some embodiments, there is provided a system comprising a database of power lines and their locations; the database may include other information relating to the power line, such as voltages and/or currents associated therewith and availability information (including times of day the power line may or may not be available and/or whether the power line is restricted for other reasons). In some cases, vehicles may comprise a data storage medium having the database recorded thereon, or it may have communicative access to a remote database; on some cases, vehicles may have both.

In some embodiments, there is provided a vehicle-based routing method for vehicles disclosed herein (e.g. a vehicle comprising an electrically powered propulsion system for controllably causing the vehicle to move to a desired location, a rechargeable electrical storage for storing electrical power and providing electrical power for the vehicle, and a power line charging unit, the power line charging unit comprising a removably attachable charging unit for generating through induction electrical power from a power line electromagnetic field). In general, the method involves determining a route from an origin to a final destination. It may include steps for determining intermediate locations that include power line charging sites. It may also include determining intermediate locations that are origins and/or final destinations for one or more other routes that may be incorporated in a first route. The routing method may, in addition to determining possible routes, include steps for optimizing a route by selecting the shortest route, a route which maintains a minimum distance to possible charging sites, avoids or includes particular locations or regions, consumes the least amount of energy or travel time, prioritizes certain objectives or routes over others, or other factors. In some embodiments, the method comprising the steps: determining, based on the distance between the vehicle and the desired location and a weight of the vehicle plus a vehicle payload (if any), a required amount of electrical power for moving the vehicle to the desired location; if said required amount is less than an amount stored in the storage component, accessing a power line database for providing one or more power line locations; and generating a route from a current location of the vehicle to the desired location, wherein the route includes, if said required amount is less than an amount stored in the storage component, at least one power line location and wherein the required amount between any two consecutive locations on said route would be less than maximum capacity of said storage component.

In one embodiments, there is provided a system for charging a battery-powered unmanned vehicle, the system comprising: an openable induction-based power harvesting device, said power harvesting device for releasably engaging with power lines, comprising an openable deflector component having an axial opening along the length of said deflector, said deflector component comprising a coil and a magnetic core that enclose power lines within said opening when engaged with a power line for generating electrical power through induction; an electrical-power storage component connected to said power harvesting device; and a propulsion system for positioning said vehicle for engagement with a given power line. Embodiments of systems disclosed herein may include one or more location indicators for determining a location of the vehicle, and/or one or more positional sensors for determining a position of the vehicle relative to a power line; in some cases, a given sensor may be both a location indicator and positional sensor. In some embodiments, the system may include environmental sensors, and/or a communications system, for obtaining or assessing information relating to characteristics. Some such extraneous characteristics may include one or more of the following: electrical characteristics of power lines, weather, and proximity to other things (including other battery powered vehicles, buildings, trees, etc.). In some embodiments, the system may comprise access to (or have embedded therein) a power line location information source, such as a power line database. In some embodiments, the system may further comprise a processing component, said processing component for determining a route from an origin to a final destination for an associated vehicle, and which may include intermediate destinations for charging the associated vehicle. In some embodiments, the route determination may comprise the steps of determining whether an amount of electrical power remaining in a power storage component of a vehicle is sufficient to reach a given destination and, if not, identifying one or more power line locations from said power line location information source and then causing said vehicle to include one of said one or more power line locations on a route ending with said given destination, else continuing directly to said given destination.

Referring to FIG. 1, there is shown an exemplary embodiment in one possible working environment. A flying apparatus according to an embodiment of the present disclosure in a typical use environment 100 consists of a combination of the charging device 110 and the flying apparatus 130. In the exemplary embodiment shown in FIG. 1, the flying apparatus 130 may be a drone flying by propeller. The flying apparatus can charge the battery included in the flying apparatus 130 using the power generated from the charging part 110. In some embodiments, the charging part 110 may be coupled to a flying apparatus 130; in other embodiments, the charging part may be separate from the flying apparatus 130. Embodiments are not limited to these variants, and the charging part, for example, may be configured as a one-piece non-detachable part or could include any of various possible forms including that which can be housed inside and only to be projected to the outside for charging.

Figure 2A:
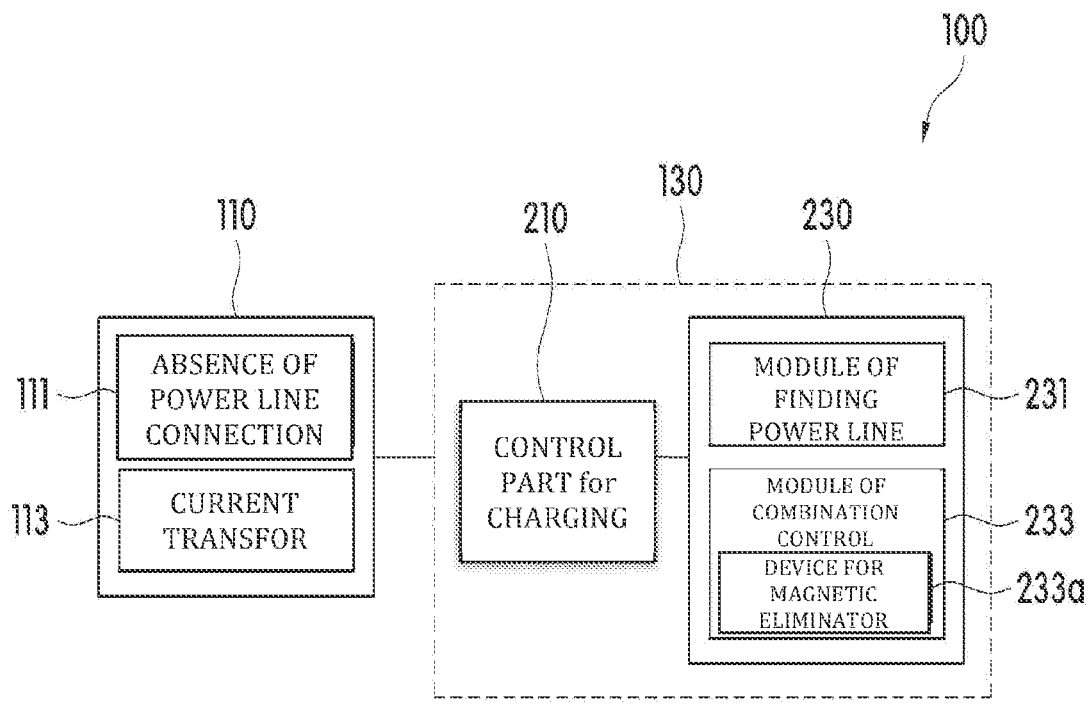
FIG. 2a shows a block diagram of the power line charging vehicle in accordance with one embodiment of the instant disclosure.

Referring to FIG. 2a, there is provided a logical diagram of the operations of the flying apparatus 100 for charging the internal battery (not shown) by using the induced electric power generated by combining the filling part 110 to a power line 150, as shown in FIG. 1 and for which corresponding functionalities are indicated in FIG. 2a.

The flying apparatus 130 using this method can have the effect of reducing this restriction of the flight time and the radius decrease so there is no need to return to the user to replace or recharge the battery.

Flying apparatus of the power line charging method according to an embodiment of the present disclosure as shown in FIG. 2a includes a charging part 110 for generating electric power for charging, a charge control part 210 for controlling the charging and coupled to an auxiliary part 230. The charging section 110 generates the power in combination with the power line. Charging section 110 generates power through electromagnetic induction using the magnetic field generated by current flowing through the power line. In some embodiments, the charging section 110 may comprise a power line coupling member 111 and the current transformer 113.

Figure 2B:
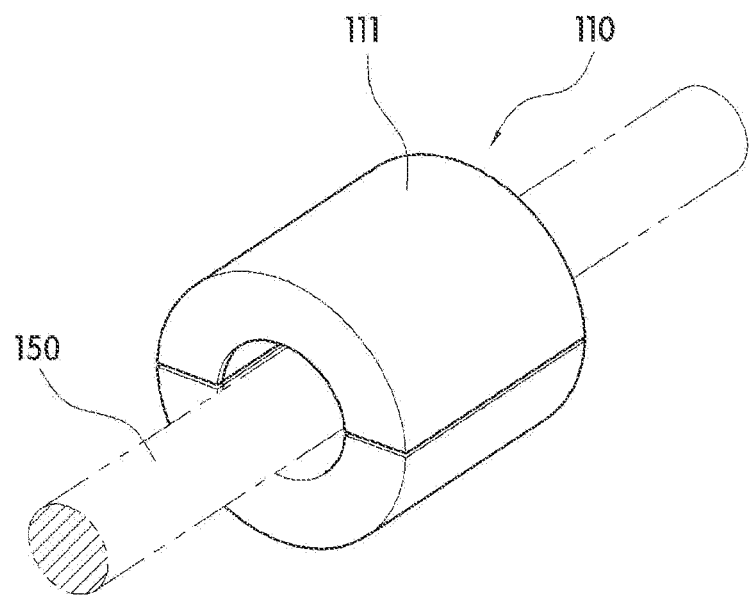
FIG. 2b shows a view of an exemplary charging part in accordance with one embodiment of the instant disclosure.

Referring to FIG. 2b, the power line coupling member 111 may be coupled to any accessible part of the unmanned flying apparatus 130 that permits the engagement of the unmanned flying apparatus 130 to a power line. A power line coupling member 111 may be preferably combined with the power line by having a power line inserted into the through-holes in the power line coupling member 111. In this case, the power line coupling member 111 is composed of a resealable part, which is possible to be opened and closed by sliding or rotation.

On the other hand, the power line coupling member 111 may also be of a cylindrical shape comprising a through hole therein, as shown in FIG. 2b, matching the power line 150 and the through-hole center being configured through-holes to be equal to, or slightly larger than, the diameter of power line to be inserted, thereby reducing the measurement error and possibility of calibration due to be one sided of the power line. However, the instantly disclosed subject matter is not limited to this; the power line coupling member may be a variety of forms.

Figure 2C:
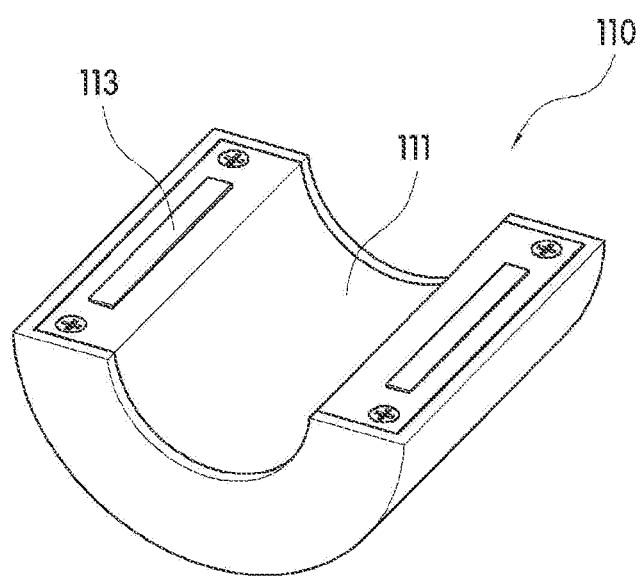
FIG. 2c shows a cross-section of the charging part in accordance with one embodiment of the instant disclosure.

Referring to FIG. 2c, the current transformer 113 is enclosed in the power line coupling member 111 to produce electric power. The current transformer, also referred to as a deflector 113, includes a magnetic core and a coil. Thus, if the power line is inserted into the through hole of the power line coupling member 111, the deflector 113, using a magnetic field that is caused by current flowing through the power line, produces an induced power.

Figure 3A:
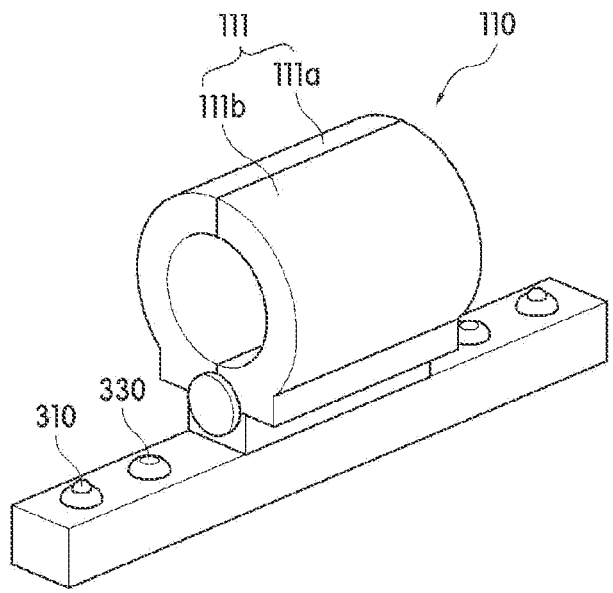
FIG. 3a shows a view of an exemplary charging system in accordance with one embodiment of the instant disclosure.
Figure 3B:
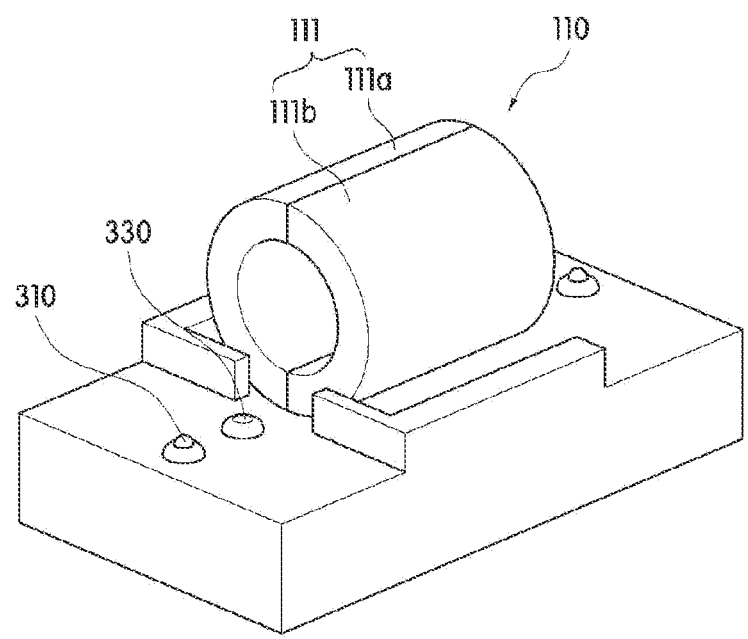
FIG. 3b shows a view of another exemplary charging system in accordance with one embodiment of the instant disclosure.

Referring to FIG. 3a, in some embodiments, charging unit 110 may also include a distance sensor 310 and/or a camera on each side 330 of the power line coupling member 111 (comprising portions of coupling member 111a and 111b). In some embodiments, the distance sensor 310 or a camera 330 may be provided on both or either sides of the charging section 110 to obtain information about the distance from the power line. In the embodiment shown, the distance sensor 310 and the camera 330 can be used to obtain information about the distance from the power line as being installed in a vertical direction parallel to the central axis of the power line coupling member 111. In some embodiments, the information on the distance obtained by the distance sensor 310 and the camera 330 may be used in association with the coupling auxiliary part 230, referred to in FIG. 2A. The charge control unit 210 may be included in the flight control system 130 and controls the battery charging operation. The charge control unit 210 determines the charging current power state to transmit the charging request signal, it needs to be recharged, and charge stop signal is sent when it is determined that charging is complete. If the charge control unit 210 checks the battery power level of the flying apparatus 130, and power level is less than a predetermined first set value, it is determined that charging is required, and send the charging request signal. If the charge control determines that the battery power level is more than a predetermined second set value, determines that the charging is not required and, when being charged, it can be sent to the charging stop signal. In some embodiments, an EMF detector may be included not shown to assist with positioning of the charging unit 110 during coupling or decoupling.

Referring to Figure b, an alternative embodiment to that of FIG. 3a is shown, in which the power coupling members may be engaged and disengaged according to an alternative method. For example, they may slidably engage and disengage.

To assist with the auxiliary coupling, part 230 is coupled with the power line 150 of the charging device 110 of the flight apparatus. Auxiliary coupling 230 includes a control charging part 210 that may search for a power line for coupling and then charging, and the charging unit 110 may determine whether it is coupled to a power line 150 or not. In this case, the auxiliary coupling 230 may include a search module power line 231 and the combination control module 233. The power line search module 231 searches for the location of the nearest charging potential power line 150 for the power line charging mode flying apparatus 100.

If power line search module 231, retrieves the location of the nearest power line 150, charging is possible upon receiving a charging request signal from the charging control unit 210. At this time, power search module 231 may be engaged, and can search the location of power line 150 using a GPS (not shown), a navigation system, or can use magnetic field sensor (figure not shown) that can measure size of magnetic field. However, the instantly disclosed subject matter is not limited to this, and the search module can search for the power line at the appropriate distance in accordance with the remaining battery level using the flight path may and also search for a power line which is nearest to the flight path.

The combination control module 233 controls the engagement of the coupling member and the power line 111 and the power line of the charging section 110. Combination control module 233 as shown in FIG. 2a, included in charging unit 100, may determine proximity and/or relative positioning to a power line using at least one of a distance sensor 310 that is provided on both sides of the power line coupling member 111 or camera 330. Although both sensor 310 and camera 330 elements are both shown together, some embodiments may use one or the other or even other positional sensors (e.g. accelerometers, GPS, etc.). The combination control module 233 may also acquire distance information, regarding the power line, from the distance sensor, the power line image information obtained from the camera 330. In some embodiments, the combination control module 233 may control the combination of the charging unit 110 to a power line by using the acquired distance information.

The combination control module 233 controls the power line coupling member 111 by opening or closing the power line coupling member 111 at the appropriate time and location by using distance information from power line 150 as acquired by the distance sensor 310 or a camera 330. In the embodiment shown, the combination control module 233 includes a self-removing device 233a; if the self-removing device 233a is in operation mode, it is possible to reduce the effect of the magnetic field resulting from the power line 150 on the magnetic core of the current transformer 113. In embodiments, it is possible to cease reducing the effect of the magnetic field of the magnetic core of the current transformer 113 during or after charging when the charging unit 110 is not being opened or closed.

When a charging stop signal is sent out from the charge controller 210, the charging unit 110 is disengaged from the power line 150. If the distance between the power line 150 and the distance sensor 310 or a camera 330 is less than a first predetermined distance, the combination control module 233 can open the power line coupling member 111. If the distance between the power line 150 and the distance sensor 310 and/or a camera 330 reaches the second predetermined distance, the combination control module 233 can close the power line coupling member 111.

In this case, if the distance between the power line 150 and the distance sensor 310 or a camera 330 is less than the first predetermined distance, the combination control module 233 can eliminate the magnetic field of the magnetic core of the current transformer 113 to convert the operation mode in the magnetic removal device 233a. If the distance between the power line 150 and the distance sensor 310 or a camera 330 is reached the second predetermined distance, it is possible to cease getting rid of the magnetic field of the magnetic core of the current transformer 113 to convert the stop mode in the magnetic removal device 233a.

Further, if a charging stop signal is sent out from the charge controller 210, the combination control module 233 opens the power line coupling member 111. If the distance between the power line 150 and the distance sensor 310 or a camera 330 is more than the first predetermined distance, the combination control module 233 will close the power line coupling member 111.

In this case, if a charging stop signal is sent out from the charge controller 210, the combination control module 233 can eliminate the magnetic field of the magnetic core of the current transformer 113 to convert the operation mode in the magnetic removal device 233a, If the distance between the power line 150 and the distance sensor 310 or a camera 330 is more than the first predetermined distance, the combination control module 233 can stop the removal of the magnetic field of the magnetic core in current transformer 113 to convert the stop mode in the magnetic removal device 233a.

In addition, if the distance between the power line 150 and the distance sensor 310 or a camera 330 is less than the second predetermined distance, the combination control module 233 can prevent a collision between unmanned flying apparatus 130 and the power line 150 by transmitting a collision risk signal.

According to some embodiments of the present disclosure, the engagement or combination process between the power line and the power line coupling member is shown in FIGS. 4a through 4h. FIGS. 4a through 4d show the engagement process between the power line and the power line coupling member using a hinged or rotating mechanism according to an embodiment of the disclosure. FIGS. 4e through 4h show the engagement process between the power line and the power line coupling member of sliding form.

Figure 4A:
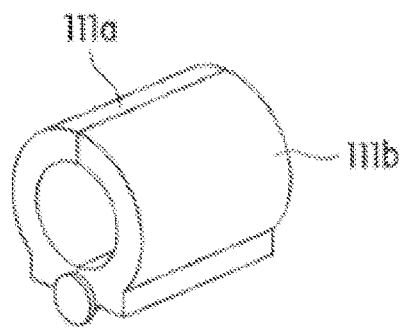
FIG. 4a shows a step of a first exemplary coupling process of a power line in accordance with an embodiment of the instant disclosure.
Figure 4B:
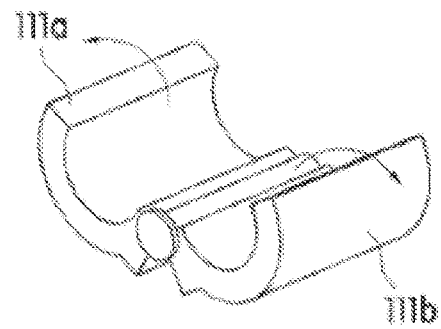
FIG. 4b shows another step of the first exemplary coupling process of a power line in accordance with an embodiment of the instant disclosure.
Figure 4C:
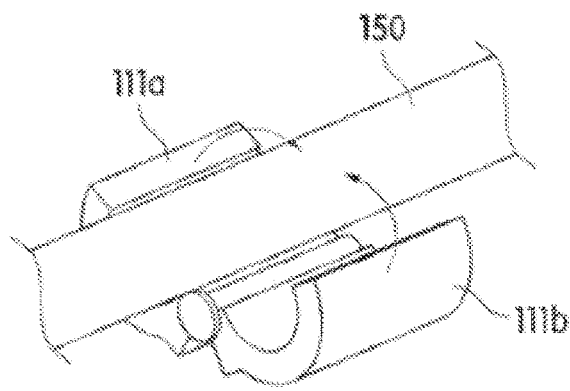
FIG. 4c shows another step of the first exemplary coupling process of a power line in accordance with an embodiment of the instant disclosure.
Figure 4D:
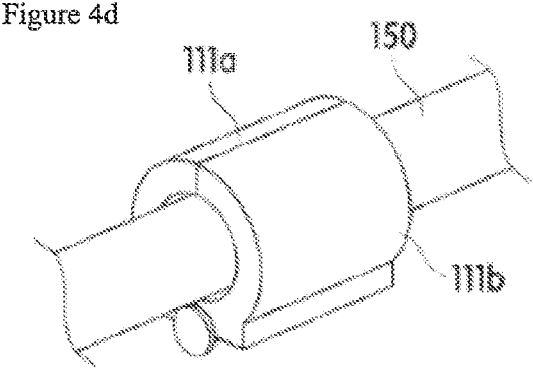
FIG. 4d shows another step of the first exemplary coupling process of a power line in accordance with an embodiment of the instant disclosure.
Figure 4E:
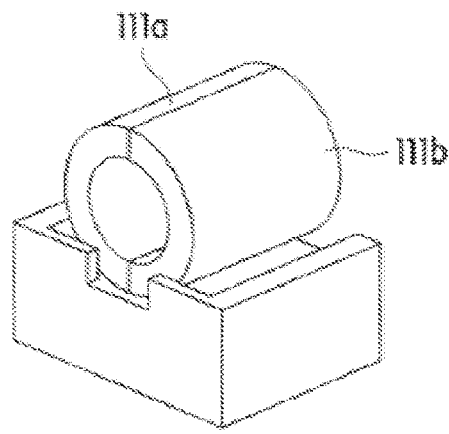
FIG. 4e shows a step of a second exemplary coupling process of a power line in accordance with another embodiment of the instant disclosure.

Referring to FIGS. 4a through 4d, according to an embodiment of the present disclosure, a rotational form of power line coupling member 111 is composed of the first opening and closing member 111a and the second opening and closing member 111 b. Power line coupling member 111 in rotational form disconnected to be charged constitutes through-holes in between the first opening and closing member 111a and the second opening and closing member 111b (FIG. 4a). In some embodiments, upon receiving a charge request signal from the charging determination module, power line coupling member 111 in rotational form can form one side open through-holes by opening the other side that is not connected to the flying apparatus 130 by rotating both the first opening and closing member 111a and the second opening and closing member 111b (FIG. 4b). A rotational form of a power line coupling member 111 can be engaged with a power line by inserting power line 150 to through-holes along the opening between opening and closing member 111a and the second opening and closing member 111b (FIG. 4c), and then by closing opened through-holes by rotating opposite rotated direction (FIG. 4d).

Figure 4F:
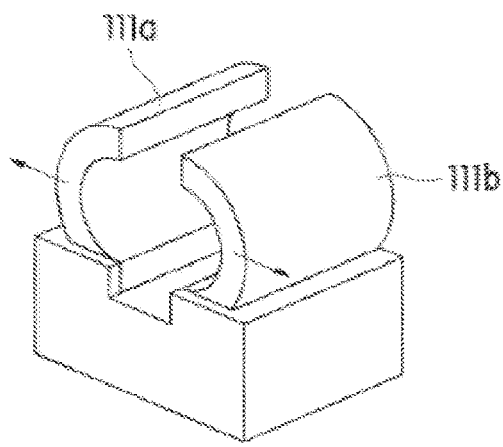
FIG. 4f shows another step of the second exemplary coupling process of a power line in accordance with another embodiment of the instant disclosure.
Figure 4G:
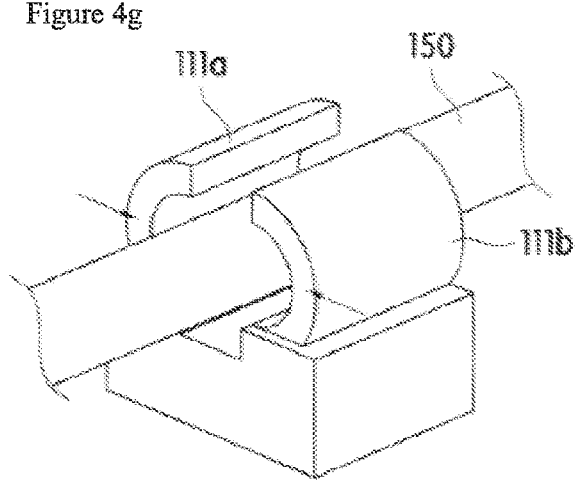
FIG. 4g shows another step of the second exemplary coupling process of a power line in accordance with another embodiment of the instant disclosure.
Figure 4H:
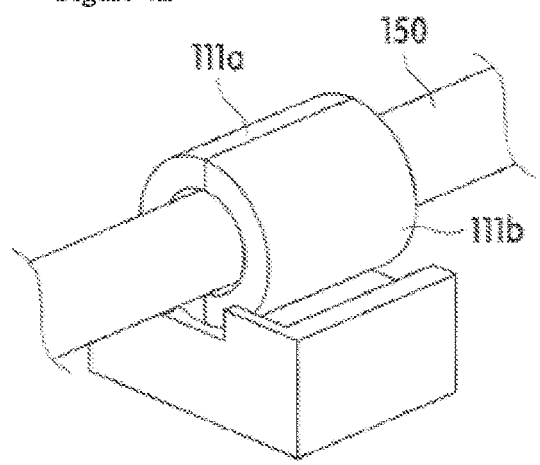
FIG. 4h shows another step of the second exemplary coupling process of a power line in accordance with another embodiment of the instant disclosure.

In another embodiment, referring to FIGS. 4e through 4h, there is provided a sliding type of a power line coupling member. In the embodiment shown in FIG. 4e, there is provided a first moveable member 111a and the second member 111 b, the latter of which may or may not also be moveable. Such embodiment constitutes a power line coupling member 111 that is of a sliding type that is not associated with a power line for charging, the first opening and closing member 111a and the second member 111b through-holes in an open position (FIG. 4f). In such an embodiment, upon receiving a charge request signal from the charging determination module, a rotational form of a power line coupling member 111 can be formed in one-side opened through-holes isolated by sliding the first moveable member 111a towards the second member 111 b (or by sliding them toward each other, in the case of both members being moveable. Such sliding type embodiments of a power line coupling member 111 may provide for the insertion of a power line into through-holes, when first moveable member 111a and the second member 111b are in an open position (FIG. 4g), by closing opened through-holes by the first moveable member 111a and the second member 111b after the power line is positioned therebetween (FIG. 4h).

In another embodiment, there is provided a power line coupling member 111, comprising movable members 111a and 111b, in an open position. In such embodiments, the power line coupling member, upon receiving a charge request signal from the charging determination module, provide for the insertion of a power line 150 into the through-holes, where first moveable member 111a and the second member 111b are in an open position, then by closing opened through-holes by a power line magnetic force from a power line magnetic field.

Figure 5:
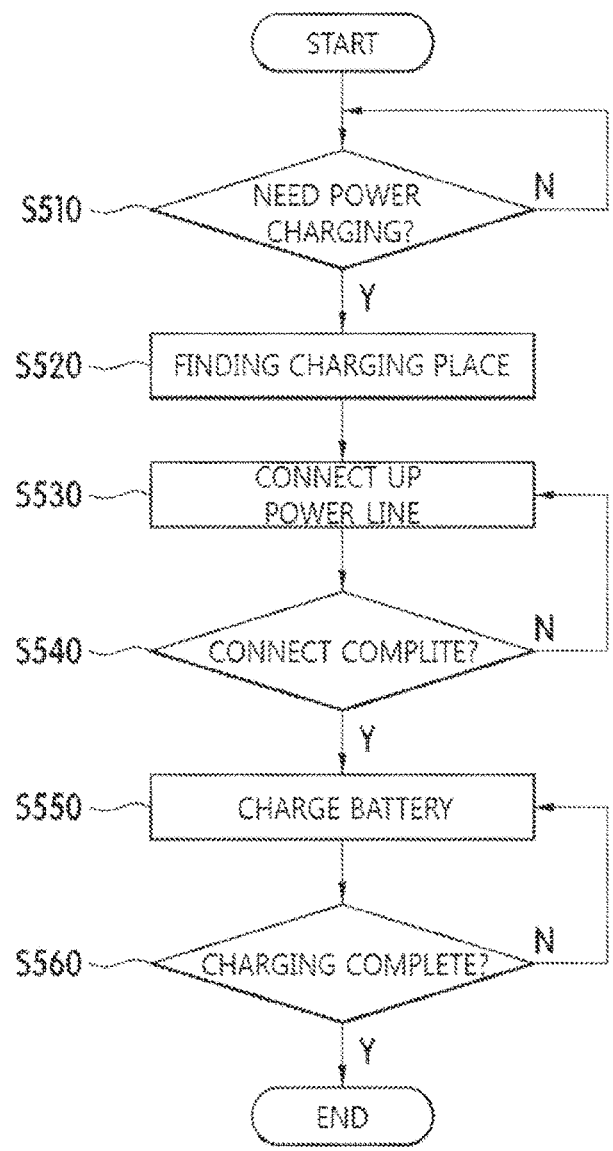
FIG. 5 is a flowchart of a charging method of the charging mode power line vehicle according to an embodiment of the present disclosure.

Referring to FIG. 5, there is shown a flow chart of the charging method of the charging mode power line flying apparatus according to an embodiment of the present disclosure. The charging method includes a step of determining the power charge necessity, S510, determining a filling position S520, coupling the power line S530, determining whether the power line is coupled completely S540, initiating a charging S550, and the filling (i.e. charging) comprising the step S560 that determines whether the filling has completed.

Hereinafter described with reference only to the power line charging mode flying apparatus shown in FIG. 2a for illustrating a description of the charging method according to an embodiment of the present disclosure as shown in FIG. 5. According to an embodiment of the present disclosure, a charging method of a flying apparatus by power lines 150, first, determines whether the charging electric power is required (step S510. Charge control of flight apparatus then checks the remaining battery power after every predetermined interval (or in some cases, upon the occurrence of a given event or triggering event, or upon request). If the identified power level is greater than a first set value (which may be predetermined or calculated), the charging control unit will periodically repeat the step of determining the electric power remaining in the battery; if the power level is identified as the first set value or less, the charge control initiates a charging request signal.

Next, to determine the charging position (step S520). A flying apparatus, using the power-line search module, searches for the closest possible position of a charging power line. The flying apparatus may then determine the location of the nearest power line where the flying apparatus can charge. Also, the flying apparatus may determine locations of additional power line information, such as the nearest location along the flight path, the location in the proper distance, depending on the battery remaining and so on.

The flying apparatus may, in some embodiments, determine the filling position using the navigation system such as GPS (not shown), or a magnetic field sensor (not shown) for the nearest location by measuring the magnitude of the magnetic field, and it may decide to search for the charging position using stored information (e.g. a power line location database—not shown).

Next, the flying apparatus approaches the power line and assumes the charge-determined position (step S530). The flying apparatus engages with the power line and assumes the charge position determined by the power line coupling member. In some embodiments, the combination control module may perform coupling (i.e. engagement) of the power line by controlling the opening and closing of the power line coupling member by using the distance and the predetermined distance value between the power line and/or a distance sensor or the camera contained in the distance information obtained by the distance sensor or camera.

In some embodiments, the combination control module includes a magnetic removal device. Such magnetic removal device renders it possible to remove, counteract, or overcome the magnetic field of the magnetic core of the current transformer, thus facilitating the removal of the magnetic field of the magnetic core of the current transformer.

When the charge requesting signal transmits from the charging control in step S510, if the distance between the power line and the distance sensor or a camera is less than the first predetermined distance, the combined control module can open the power line coupling member, else if the distance is reached the second predetermined distance, the combined control module can close the power line coupling member.

In some embodiments, it is possible to counteract the magnetic field acting on the magnetic core of the current transformer to facilitate the removal device in the operation mode. When it reaches the predetermined second distance value, it converts the magnetic removal device to stop mode, which overcomes, in whole or in part, the magnetic field acting on the magnetic core of the current transformer thereby permitting same to be de-coupled or removed from around the power line.

In embodiments, the power line coupling member may be coupled to the power line by a power line inserted into the through-holes provided in the power line coupling member. In this case, the power line coupling member is configured to open and close the through-hole by sliding or rotation when the power line is positioned within the power line coupling member.

Next, the flying apparatus determines whether or not the coupling to the power lines is completed (step S540). Coupling a control module of the flying apparatus, when the distance between the power line and a distance sensor or a camera that does not correspond to the second distance value, it is determined that the engagement of the power line is not completed. And then, it can be recoupled with the power line by repeating the step S530.

Next, when it is determined that the coupling of the power line is completed, the flying apparatus initiates charging the battery (step S550). Flying apparatus then generates the inductive power using the magnetic field generated from the power line and, by using the generated electric power, charges the battery associated with the flying apparatus. At this time, the flying apparatus may, in some embodiments, be able to generate the inductive power using the classifier contained packing. When current transformers are inserted through-holes in the power line combined power line member, it is thus possible to make electric power using current in power lines.

In some embodiments, a current transformer includes a magnetic core and a coil, and, using a magnetic field generated from the power line, generates inductive power. The flying apparatus can charge the battery using the induced electric power generated in the current transformer.

Finally, unmanned flying apparatus determines that the charging is completed (step S560). The flying apparatus checks the power left in the battery using the charging control. At this time, if the remaining amount of battery power is less than a second set value, the charge control unit may determine that the charging is not complete and return to the step S550. On the other hand, when the residual amount of battery power is greater than a second set (predetermined or calculated) value, the charge control unit determines that charging is completed, and transmits a charging stop signal.

In some embodiments, the combination control module then opens the power line coupling member (optionally while engaging an opposing magnetic force). When the distance value between power line and distance sensor or the camera is greater than or equal to the predetermined first distance value, the flying apparatus closes the power line coupling member and unmanned flying apparatus continues to fly to the next destination.

If the charging stop signal is sent by the charging control member, it is possible in some embodiments to remove the magnetic field of the magnetic core of the current transformer to facilitate the self-removal device in the operation mode when the distance between the power line and the power line coupling member, as determined by a distance sensor or the camera, is greater than a predetermined (or calculated or received) value. If the distance is less than or equal to such value, the control module can enter a stop mode and utilize the magnetic field elimination device for facilitating removal.

Figure 6A:
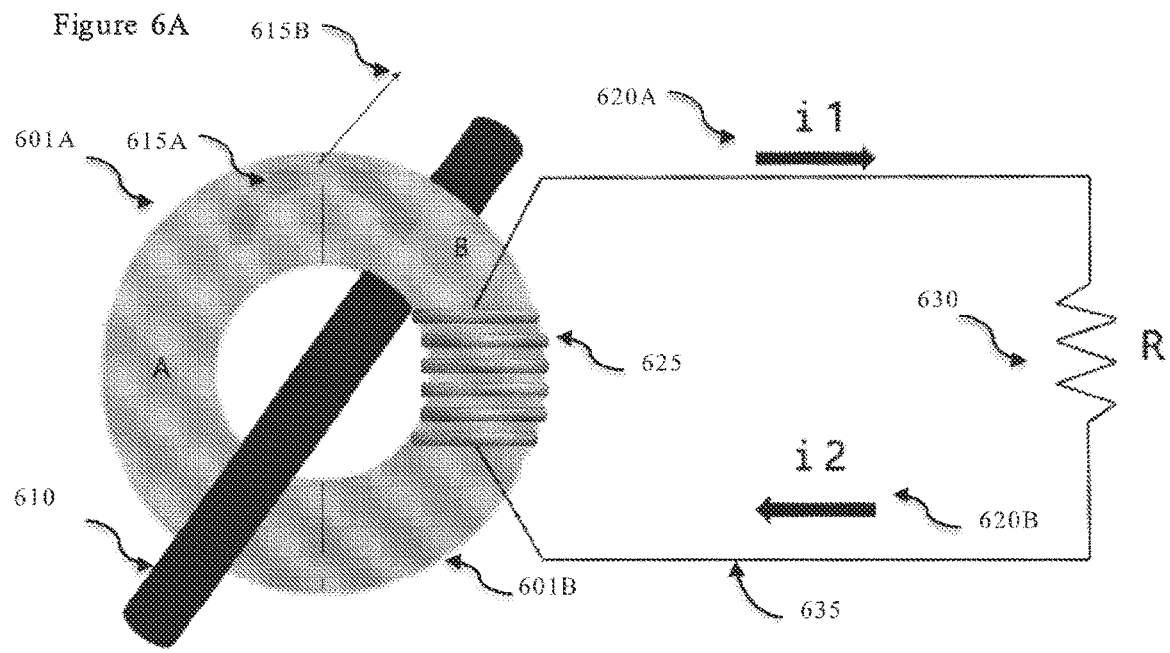
FIGS. 6A and 6B show an exemplary charging part in charging mode and separation mode, respectively, according to an embodiment of the present disclosure.
Figure 6B:
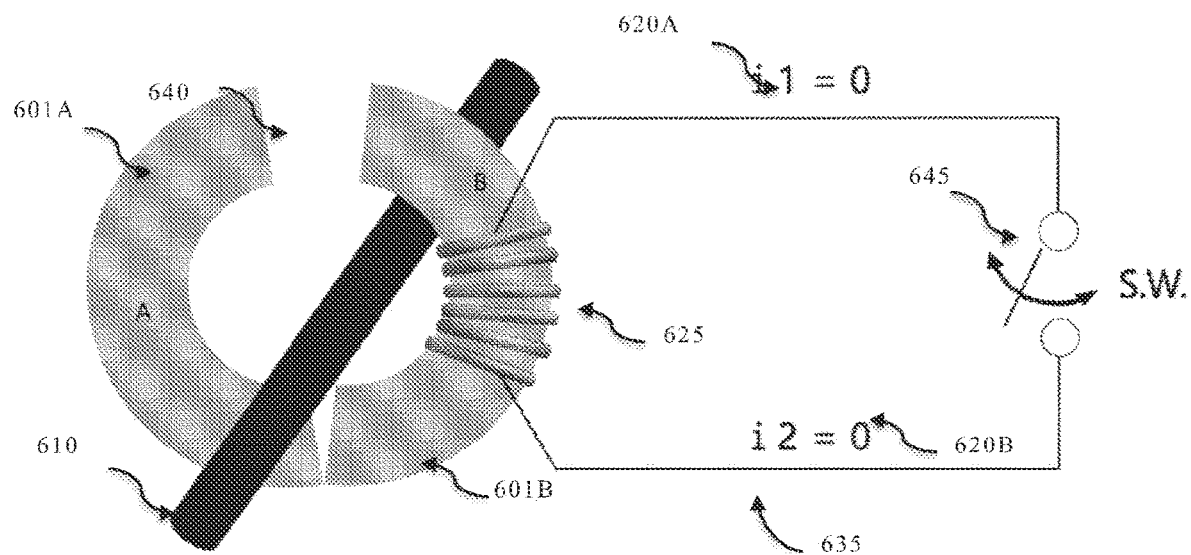

Referring to FIG. 6A, there is shown one embodiment of the current transformer, which in the embodiment shown is an openable split core transformer in two parts 601A, 601B. The openable split core transformer 601A, 601B is coupled to power line 610. Electrical current in power line 610 generates an electromagnetic field 615A, which both causes a magnetic force 615B that causes the two split core transformer parts 601A, 601B to be strongly attracted to one another. In charging mode, the electromagnetic field 615A induces a current in the current transformer coil 625 and through connected circuit 635; the load 630 has signal 620A as an input and signal 620B as an output. In this way the charging module generates electrical power for charging a connected battery (not shown). When the charging module enters separation mode, shown in FIG. 6B, a switch 645 either adds inverse signal to both i1 620A and i2 620B, or grounds the circuit 635, thus making the current flow zero at the coil. Upon eliminating the current from the coil, a significant amount of magnetic force inside the core will be eliminated. As such, the core can be separated into its two constituent parts 601A, 601B without significant mechanical force.

In one embodiment, there is provided an unmanned flying device, comprising: a charging part generating power required by combining with a power line and using electromagnetic induction to generate electrical charge; a charging control part measuring the battery power level of the unmanned flying apparatus periodically to send a charging request signal if battery power level is less than a first set value and to send a charge stop signal if battery power level is more than second set value; a combined auxiliary part to retrieve the location of the power line and facilitate combination of the power line and the charging part.

In some embodiments, there is provided a method of charging a flying apparatus, the apparatus comprising: the charging part, a power line coupling member coupled to the power line; a deflector embedded in the power line coupling member, the deflector including a magnetic core and a coil to generate an electric power using electromagnetic induction; and a measurement module that comprises at least one distance sensor and a camera to measure the distance from the power line; and a power line charging mode unmanned flight device including the more. In some embodiments, the measurement module may be arranged parallel to, and directed towards, the central axis of the through hole formed in the power line coupling member for obtaining a distance value of the power line from said axis of said through-hole. In some embodiments, the coupling auxiliary comprises a power line search module to retrieve the position of the power line for the nearest charging when obtaining the charge request signal; and a coupling control module to control the coupling of the power line and the power line of the coupling member. In some such embodiments, the combination control module, when obtaining the charging request signal, opens the through hole when measurement value is equal to or less than the first distance measurement value, and when it reaches the second distance value, closes the through-hole. In some such embodiments, the combination control module, when the charge stop signal has been triggered, opens the through-hole for insertion thereinto by a power line through positioning the charging mode unmanned flying apparatus in accordance with the measured values of the measuring module, and then closes the through-hole when it is more than the first distance. In some such embodiments, the combination control module further comprises a self-removing device, wherein by carrying out the removal, or removal of the magnetic field of the magnetic core interrupted by a magnetic removal device for controlling the coupling of the charging power line and the flying apparatus.

In some embodiments, there is provided a method of charging electrical power for flying apparatuses, the method comprising: checking the flying apparatus battery power level; determining the location of the filling location of the power line when the battery power level is less than a first set value; and performing a battery charging at said location; and determining a completion of charge of the battery, when a remaining amount of the battery current value is more than the second set value. In some such embodiments, the checking step may further comprise, if the battery power level is greater than the first set value, repeating such checking step. In some such embodiments, the location-determining step may comprise of determining the nearest power line and the unmanned flying apparatus. In some such embodiments, the step of performing a charging may further comprise charging the battery using the induced power generated from the magnetic field generated by the power line and a power line in combination. In some such embodiments, the step of repeating the performing the charging step when the stored power is less than the second set value.

In some embodiments, there is disclosed an electrically powered mobile communications interface comprising a propulsion system, a data communications connection component for connection to communications networks by wirelessly accessing one or more communications networks and providing wireless access thereto for one or more end-user communications devices that are within a communications range with said network connection, a rechargeable electrical power storage to provide electrical power to the mobile communications interface, and, in some embodiments, the propulsion system and/or the data communications connection component, and a power line charging unit comprising a current transformer operatively coupled to said rechargeable electrical power storage and operable to engage a power line in flight to recharge said rechargeable electrical power storage and remotely disengage said power line prior to further movement of said mobile communications interface.

In some embodiments, said mobile communications interface may be used as a mobile wireless data access point. In some embodiments, the location of said mobile communications interface can be controlled by the propulsion system associated with the mobile communications interface. In some embodiment, the location, scope, range, direction of coverage, and type of user access can all be controlled by or via the mobile communications interface. In some aspects, the mobile communications interface may be located or relocated based on end-user device communication requirements associated with particular locations or areas, including the number of such devices, the aggregate or demand for network usage by such devices (either in the aggregate or in accordance with a prioritization scheme depending on device ID and a respective priority associated therewith), or in association with the efficiency, power, and use of the mobile communications interface and/or one or more of the applicable end-user devices, or other characteristics thereof. Furthermore, the location or relocation of the mobile communications interface may be determined based upon indication of heightened and/or reduced use, time and/or duration of heightened and/or reduced use and a number of other relevant criteria. A determination on when and where to locate or relocate the mobile interface may be ad hoc, pre-determined (based on historical usage or other existing instructions), automatic, and/or under specific communication to the mobile interface. Accordingly, the mobile communications interface can create zones or regions wherein access to communications networks is provided to end-user devices without the need for any additional communications infrastructure (other than proximity to power lines within said regions or to power lines that are within a distance that can be reached by the mobile communications device in flight for charging). In some cases, the mobile communications interface can be located in constant engagement with existing power lines in order to provide a constant supply of induced electrical power for said communications connection. Alternatively, the rechargeable battery unit can be sufficiently charged through engagement with power lines to provide power to said data communications connection component as well as for (i) relocating the mobile communications interface to another position, not necessarily in engagement with a power line, (ii) providing network connectivity to end-user devices therefrom until such time that the rechargeable battery is depleted to a level not lower than the power required to return to a power line; and (iii) and for returning to the same or another power line for additional charging.

In some embodiments, the mobile communications interface is a remotely controlled and/or unmanned vehicle such as the drone or similar aircraft having induction power harvesting mechanisms as described elsewhere herein, which further comprises a data communications connection component for providing connection to communications networks to end-user devices within range of said communications connection components.

In some embodiments, the propulsion system provides the mobile communications interface with a mechanism for controllable movement for moving or navigating the mobile communications interface from one location to another. The means for controllable movement may comprise, for example, two or more propellers; one or more propellers with an anti-torque component; one or more fixed wings with one or more propellers; or any other means of causing the vehicle to fly in a controlled manner. The propulsion system may also be configured to controllably position the mobile communications interface in a relatively stationary position. In some aspects, given its rechargeable electrical power storage and the power line charging unit, the mobile communications interface may operate in the vicinity of any power lines, utilizing existing power line infrastructure for recharging its rechargeable electrical power storage, which may include batteries, during or between periods of travel and/or provision of communications network access, leading to sustainable provision of mobile access to one or more communications networks, particularly when there are two or more such mobile communications interfaces that can alternately provide communications interfacing and recharge through induction harvesting. As such, said mobile interface, in accordance with the instantly described subject matter can provide mobile access to communications networks in areas where such an access would not be readily available. Furthermore, since existing power lines are commonly found along major and/or less traveled routes and amongst more and/or less populated and/or industrialized areas, sustainable mobile local network may be made available at various locations along or near such routes or areas. Said mobile interface's mobility and coverage will depend on various factors, including but not limited to the location of power lines and the battery capacity of the rechargeable electrical power storage.

In some embodiments, the data communications connection component may obtain wireless access to one or more communications networks and allow wireless access thereto by one or more end-user communications devices within range of said communications connection component. In some aspects, the data communications connection component may include one or more communications interfaces for wireless communication with one or a plurality of end-user communications devices, concurrently, within range of said communications interface. Examples of end-user communications devices include other mobile phones or smartphones, computers and other computing devices, interfaces, modules, vehicles, IoT or other such network connectable devices, or any other device configured to communicate over a communications network such as the Internet or a LAN, WAN, or similar networks. Examples of technologies the communications interface may employ for obtaining to external communications networks such as the Internet or other data networks, may include, but are not limited to, portable satellite Internet access, cellular network, Worldwide Interoperability for Microwave Access (WiMAX), Wireless Internet Service Providers (WISPs), Local Multipoint Distribution Service (LMDS), or any other wireless communication network interfacing methods. The communications interface of the data communications connection component will generally comprise modules required by the technology employed for wireless communications with said one or more communications networks and/or wireless access to said one or more communications networks by the one or more end-user communications devices. As an example, where portable satellite internet access is utilized, the communications interface may include a portable satellite modem, which usually come in the shape of a self-contained flat rectangular box that needs to be in the general direction of the satellite. The communications interface may further comprise Ethernet or Universal Serial Bus, or integrated Bluetooth transceiver. Similarly, where a cellular network is employed, the communications interface may comprise a portable built-in modem, or removable devices to communicate with at least one fixed-location transceiver, a Base Transceiver Station. Where WiMAX is employed, the communications interface may comprise a receiver and antenna, examples of which include a small box or PCMCIA card, or a built-in unit. Employment of WiMAX may utilize non-line-of-sight service and/or line-of-sight service. Where WISPs or LMDS is employed, the communications interface may include an antenna and a receiver. Examples of the communications interface for providing wireless access may include a module to provide a wireless access point for wireless local area communications networks, which would permit more or more bi-directional transmission of data, specifically, mobile hotspots, routers, and other respective modules to technology utilized. In some embodiments, the communications connection acts as a wireless access point that allows Wi-Fi compliant end-user devices to access a communications network to which the mobile communications interface is communicatively connected.

In some aspects, reliable communications may be provided to facilitate the provision of access to communications networks by the end-user communications devices throughout a given region, area or corridor even if such devices pass from the coverage region of a first mobile communications interface to another such mobile communications interface. By arranging a plurality of the mobile communications interfaces so that the range of coverage for each of said mobile communications devices are overlapping, or at least adjacent to one another, for example, along a route, and in any case without any significant gaps therebetween, large geographical regions can be generated to provide communications network access to end-user devices when they are with such aggregated coverage areas. This becomes possible without the development of new communications infrastructure since mobile communications interfaces can be moved into any desired areas, limited only by flight times to power lines, location of power lines relative to areas of coverage, available electrical power storage capacity, and power usage. In such embodiments, there may also be provided a method of handing off or transferring communications sessions with a given end-user device as it moves from the coverage region of one mobile communications device to another. This may include connection-oriented communications sessions, and may use handshaking process, to thus continue communications as the end-user device passes from coverage region to coverage region. Such passing of communications may include quality of service functionalities such as verification of the transmission, and guarantees of delivery of data. In some embodiments, additional mobile communications devices may be provided for a given region, even with essentially overlapping coverage, to accommodate an increase in the number of end-user devices connecting with a communications network, possibly in a particular time period; in such cases, a single mobile communications device may become overwhelmed, in which case an additional one or more devices can be supplied.

In some embodiments, there is provided a system which automatically determines demand for communications connections by end-user devices (either or both on a per device basis or an overall data transfer basis), and then automatically routes more or less mobile communications interfaces in accordance with the actual or predicted demand.

While the present disclosure describes various exemplary embodiments, the disclosure is not so limited. To the contrary, the disclosure is intended to cover various modifications and equivalent arrangements included within the general scope of the present disclosure.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An electrically powered aircraft comprising:
a propulsion system;
a navigation control system operatively coupled to said propulsion system to navigate the aircraft to a desired location;
a rechargeable electrical power storage to power the aircraft during operation;
a power line charging unit comprising a current transformer operatively coupled to said rechargeable electrical power storage and operable to engage a power line in flight to recharge said rechargeable electrical power storage and remotely disengage said power line once recharged, said power line charging unit configured to generate an opposing magnetic force opposite in direction to a power line magnetic force generated by the power line electromagnetic field when reconfiguring said charging unit between an open position and a closed position.

2. The aircraft of claim 1, wherein said current transformer comprises a split core transformer remotely actuated to engage and disengage said power line in flight.

3. The aircraft of claim 1, wherein said navigation control system is operable to automatically identify proximity to said power line and navigate the aircraft thereto to be recharged.

4. A vehicle, said vehicle being powered by electrical power, the vehicle comprising:
a propulsion system, said propulsion system for controllably causing the vehicle to move to one or more desired locations, said propulsion system being electrically powered;
a rechargeable electrical storage for storing electrical power and providing at least some of said electrical power for the vehicle;
a navigation system to provide movement instructions for said vehicle indicative of said desired locations relative to a current location;
a power line charging unit, the power line charging unit comprising a removably attachable deflector for generating through induction electrical power from a power line electromagnetic field, wherein the deflector comprises a coil and a magnetic core and said deflector generates an electrical current through induction; and
a magnetic field opposer for generating an opposing magnetic force opposite in direction to a power line magnetic force generated by the power line electromagnetic field when reconfiguring said power line charging unit between an open position and a closed position.

5. The vehicle of claim 4, wherein said navigation system automatically determines a route from a current location to the desired location.

6. The vehicle of claim 4, wherein said desired location comprises a position of said vehicle relative to a power line.

7. The vehicle of claim 6, wherein said vehicle comprises one or more location sensors.

8. The vehicle of claim 6, wherein said one or more location sensors comprise at least one of the following: a camera, a gyroscope, an accelerometer, a pressure sensor, a motion detector, a light sensor, a combination of a light source and the light sensor, radar, and LIDAR.

9. The vehicle of claim 6, wherein the navigation system moves the vehicle into a charging position relative to a given power line, wherein the charging position is suitable for engagement by said charging component with said given power line.

10. The vehicle of claim 1, wherein said navigation system initiates a charging mode when remaining power in said rechargeable electrical storage is less than a threshold value.

11. The vehicle of claim 10, wherein said navigation system identifies one or more available power lines for charging upon initiation of said charging mode.

12. The vehicle of claim 10, wherein said navigation systems changes said desired location to be a location of a selected one of said one or more available power lines.

13. The vehicle of claim 11, wherein said vehicle accesses a power line database for providing power line location information.

14. A power-line induction-based power harvesting device for releasably engaging with power lines, comprising an openable deflector component having an axial opening along the length of said deflector, said deflector component comprising a coil and a magnetic core that enclose power lines within said opening when engaged with a power line, said harvesting device configured to collect electrical power generated through induction within said coil; wherein said harvesting device is configured to generate an opposing magnetic force that is opposite in direction to a power line magnetic force generated by an electromagnetic field generated by an enclosed power line which inhibits opening of the deflector when disengaging with power lines.

15. The harvesting device of claim 14, wherein the harvesting device is secured to a vehicle.

16. The harvesting device of claim 15, wherein the vehicle is an unmanned vehicle.

17. The harvesting device of claim 14, wherein the device further comprises one or more sensors for determining a relative position of said device to the power line.

18. The harvesting device of claim 17, wherein the relative position is for indicating a position during at least one of engagement or disengagement with a given power line.

19. The harvesting device of claim 17, wherein the one or more sensors comprise at least one of a distance sensor and a camera.

\* \* \* \* \*